United States Patent
Soleno et al.

(10) Patent No.: US 8,804,378 B2
(45) Date of Patent: Aug. 12, 2014

(54) OPTIMIZING ISOLATED POWER SUPPLY LOOP GAINS FOR OPTO-COUPLER CURRENT TRANSFER RATIO VARIATIONS

(75) Inventors: Antonio Remetio Soleno, Mandaluyong (PH); Jonathan Ross Bernardo Fauni, Quezon (PH)

(73) Assignee: Astec International Limited, Kwun Tong, Kowloon (HK)

( * ) Notice: Subject to any disclaimer, the term of this patent is extended or adjusted under 35 U.S.C. 154(b) by 294 days.

(21) Appl. No.: 13/249,396

(22) Filed: Sep. 30, 2011

(65) Prior Publication Data

US 2013/0082674 A1 Apr. 4, 2013

(51) Int. Cl.
*H02M 3/335* (2006.01)
(52) U.S. Cl.
USPC .......................... 363/21.07; 323/902; 702/106
(58) Field of Classification Search
USPC ................. 323/902; 363/21.05, 21.07, 21.13, 363/21.15; 702/106
See application file for complete search history.

(56) References Cited

FOREIGN PATENT DOCUMENTS

WO WO 2011/036489 * 3/2011 ............. H04B 10/00

* cited by examiner

*Primary Examiner* — Harry Behm
*Assistant Examiner* — Matthew Grubb
(74) *Attorney, Agent, or Firm* — Harness, Dickey & Pierce, P.L.C.

(57) ABSTRACT

A method of optimizing a gain adjustment value Kadj for a digital controller in an isolated switched mode power supply. The power supply includes an opto-coupler having a current transfer ratio ($CTR_X$) within a range defined by a minimum current transfer ratio ($CTR_{MIN}$) and a maximum current transfer ratio ($CTR_{MAX}$). The method includes determining the $CTR_X$ of the opto-coupler, determining an optimal gain adjustment value $Kadj_X$ based on the determined $CTR_X$ of the opto-coupler, and storing the optimal gain adjustment value $Kadj_X$ in the digital controller. The method can be performed by the digital controller or by a programming device external to the power supply.

19 Claims, 8 Drawing Sheets

OPTIMIZING ISOLATED POWER SUPPLY LOOP GAINS FOR OPTO-COUPLER CURRENT TRANSFER RATIO VARIATIONS

FIELD

The present disclosure relates to optimizing isolated power supply loop gains for opto-coupler current transfer ratio variations.

BACKGROUND

This section provides background information related to the present disclosure which is not necessarily prior art.

Isolated power converters are commonly used to provide electrical isolation between two interrelated systems, such as a power source and an electric load. In many cases, isolated power converters are required to satisfy safety specifications. Thus, isolation must be provided in the power stage and in the control loop of the power converter. Power stage isolation is typically provided using a transformer. Isolation in the feedback control loop is often provided through an opto-coupler (also known as an opto-isolator).

A disadvantage of using opto-couplers is the large unit-to-unit variation in their current transfer ratios (CTRs). The performance of the power supply (including its loop gain) is related to, among other things, the CTR of its opto-coupler. Therefore, the variations in CTR from one opto-coupler to another imposes constraints on control loop design.

SUMMARY

This section provides a general summary of the disclosure, and is not a comprehensive disclosure of its full scope or all of its features.

According to one aspect of the present disclosure, a method is provided for optimizing a gain adjustment value Kadj for a digital controller in an isolated switched mode power supply. The power supply includes an opto-coupler having a current transfer ratio ($CTR_X$) within a range defined by a minimum current transfer ratio ($CTR_{MIN}$) and a maximum current transfer ratio ($CTR_{MAX}$). The method includes determining the $CTR_X$ of the opto-coupler, determining an optimal gain adjustment value $Kadj_X$ based on the determined $CTR_X$ of the opto-coupler, and storing the optimal gain adjustment value $Kadj_X$ in the digital controller.

According to another aspect of the present disclosure, an isolated switched mode power supply includes a power circuit having an output terminal, and a control circuit for the power circuit. The control circuit includes a digital controller and an opto-coupler having a current transfer ratio ($CTR_X$) within a range defined by a minimum current transfer ratio ($CTR_{MIN}$) and a maximum current transfer ratio ($CTR_{MAX}$). The digital controller has a feedback terminal coupled to the output terminal of the power circuit, and an error voltage terminal coupled to the opto-coupler. The control circuit is configured to determine the $CTR_X$ of the opto-coupler when the output terminal is coupled to a known load, determine an optimal gain adjustment value $Kadj_X$ based on the determined $CTR_X$, and store the determined optimal gain adjustment value $Kadj_X$ for subsequent use by the digital controller in controlling operation of the power circuit.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Figure 1:
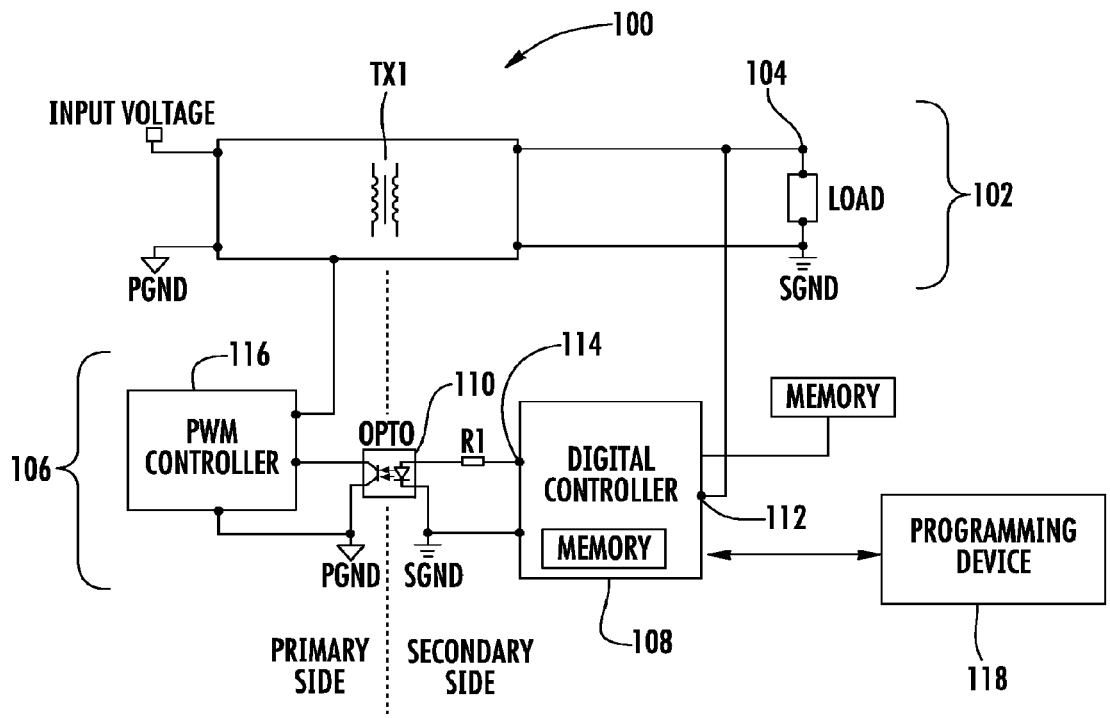
FIG. 1 is a block diagram of an isolated switched mode power supply according to one example embodiment of the present disclosure.

An isolated switched mode power supply according to one aspect of the present disclosure is illustrated in FIG. 1 and indicated generally by reference number 100. As shown in FIG. 1, the power supply 100 includes a power circuit 102 and a control circuit 106 for controlling operation of the power circuit 102. The power circuit 102 includes at least one transformer TX1 and an output terminal 104. The control circuit 106 includes a digital controller 108 and an opto-coupler 110. The digital controller 108 includes a feedback terminal 112 coupled to the output terminal 104, and an error voltage terminal 114 coupled to the opto-coupler 110 via a resistor R1.

The opto-coupler 110 has a current transfer ratio ($CTR_X$) within a range defined by a minimum current transfer ratio ($CTR_{MIN}$) and a maximum current transfer ratio ($CTR_{MAX}$). Further, the digital controller 108 typically stores and uses a data value, referred to herein as a gain adjustment value Kadj, to adjust the loop gain of the power supply 100. As further explained below, the gain adjustment value Kadj stored and used by the digital controller 108 can be optimized for the $CTR_X$ of the opto-coupler 110 to improve performance of the power supply 100.

As shown in FIG. 1, the control circuit 106 may further include a PWM controller 116 for controlling one or more power switches (not shown) on the primary side of the power circuit 102. The digital controller 108 may include internal and/or external memory, and may also include an input for interfacing with an external programming device 118 using any suitable communication bus (e.g., PMBus, I2C, etc.).

As should be apparent, one or more components of the isolated power supply 100 illustrated in FIG. 1 may be omitted in various applications of this disclosure. Further, additional components not specifically shown in FIG. 1 may be included in certain applications, such as an output current sensor, a buffer between the error voltage terminal 114 and the opto-coupler 110 for driving the opto-coupler, a voltage scaling device between the output terminal 104 and the digital controller 108, etc.

Figure 2:
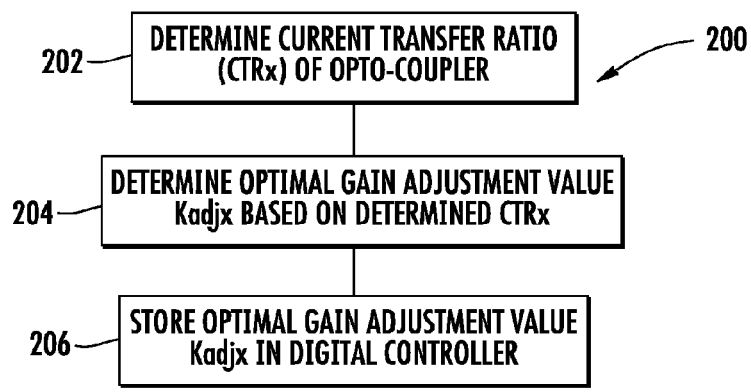
FIG. 2 is a flow diagram of a method of optimizing a gain adjustment value Kadj for a digital controller in an isolated switched mode power supply having an opto-coupler according to one aspect of the present disclosure.

FIG. 2 illustrates a method 200 for optimizing a gain adjustment value Kadj for a digital controller in an isolated switched mode power supply having an opto-coupler according to another aspect of the present disclosure. The opto-coupler has a current transfer ratio ($CTR_X$) within a range defined by a minimum current transfer ratio ($CTR_{MIN}$) and a maximum current transfer ratio ($CTR_{MAX}$). The method 200 is generally applicable to any isolated power supply that includes a digital controller and an opto-coupler. One example of such a power supply is the isolated power supply 100 of FIG. 1.

As shown in FIG. 2, the method 200 includes determining the $CTR_X$ of an opto-coupler in step 202, determining in step 204 an optimal gain adjustment value $Kadj_X$ based on the determined $CTR_X$ of the opto-coupler, and storing in step 206 the determined optimal gain adjustment value $Kadj_X$ in the digital controller.

With further reference to step 202, the $CTR_X$ of the opto-coupler may be determined in any suitable manner. For example, the $CTR_X$ of the opto-coupler may be provided by the manufacturer or vendor of the opto-coupler, and thus determined in that manner. In other cases, only a range of the CTR value may be known. For example, a vendor may indicate that opto-couplers having the same part number will have a particular $CTR_X$ falling within a range defined by $CTR_{MIN}$ and $CTR_{MAX}$ (inclusive). In that event, the $CTR_X$ of a particular opto-coupler having that part number may be determined through testing, before the opto-coupler is installed in the isolated power supply. Alternatively, the $CTR_X$ of that opto-coupler may be determined after the opto-coupler is installed in the isolated power supply, by appropriate testing of the power supply unit and/or like power supply units. Some example methods of determining the $CTR_X$ of a particular opto-coupler, before or after the opto-coupler is installed in a power supply unit, are described below.

Referring to step 204 in FIG. 2, the optimal gain adjustment value $Kadj_X$ can be determined based on the $CTR_X$ (determined in step 202) through calculations (e.g., simulations) and/or testing. For purposes of this disclosure, a gain adjustment value Kadj stored and used by the digital controller in a power supply unit is considered optimal when it enables the power supply to satisfy performance specifications, such as gain margin, phase margin and/or dynamic loop response specifications, regardless of the $CTR_X$ of its opto-coupler.

In some embodiments, a gain adjustment value $Kadj_{MAX}$, which represents a gain adjustment value that would allow the power supply to meet performance specifications if the $CTR_X$ of its opto-coupler is equal to $CTR_{MAX}$, is first determined through calculations and/or testing. Then, the optimal gain adjustment value $Kadj_X$ is determined using the following equation:

$$Kadj_X = Kadj_{MAX} \cdot CTR_{MAX} \div CTR_X$$

Once determined in any suitable way, the optimal gain adjustment value $Kadj_X$ is stored in the digital controller (including, when applicable, external memory used by the digital controller), as indicated in step 206 of FIG. 2, for subsequent use by the digital controller to control the associated power circuit in the isolated power supply unit.

In some embodiments, the $CTR_X$ of an opto-coupler in a particular power supply unit is determined from the following equation:

$$CTR_X = \frac{CTR_{MAX} - CTR_{MIN}}{V_{EAMAX} - V_{EAMIN}} (V_{EAX} - V_{EAMIN}) + CTR_{MIN}$$

where: $V_{EAX}$ represents an error voltage that is (or would be) output by the digital controller (e.g., at terminal 114 in FIG. 1) when the power supply is coupled to a known load and the digital controller is operating with the gain adjustment value $Kadj_{MAX}$; $V_{EAMIN}$ represents an error voltage that would be output by the digital controller if the power supply was coupled to the known load, the $CTR_X$ of its opto-coupler was equal to $CTR_{MIN}$, and the digital controller was operating with a default gain adjustment value $Kadj_D$; and $V_{EAMAX}$ represents an error voltage that would be output by the digital controller if the power supply was coupled to the known load, the $CTR_X$ of its opto-coupler was equal to $CTR_{MAX}$, and the digital controller was operating with a default gain adjustment value $Kadj_D$.

Similar to the parameter $Kadj_{MAX}$, the parameters $V_{EAX}$, $V_{EAMIN}$ and $V_{EAMAX}$ may be determined through calculations, such as circuit simulations. However, such calculations will be based on various assumptions such as, for example, the equivalent series resistance of an output capacitance (which may vary with temperature), the sampling rate of the digital controller (which may have unit-to-unit variations), etc. Therefore, it may be preferable to determine these values based on actual testing of the power supply unit and/or like power supply units.

In one preferred embodiment, the parameters $V_{EAMIN}$, $V_{EAMAX}$ and $Kadj_{MAX}$ are determined in a pre-optimizing procedure based on testing of a sample power supply unit. These parameters are then stored for subsequent use in an optimizing procedure, where optimal gain adjustment values $Kadj_X$ are determined for like power supplies (i.e., power supplies having the same design as the sample power supply unit). These procedures are described below with reference to FIGS. 3-5.

Figure 3:
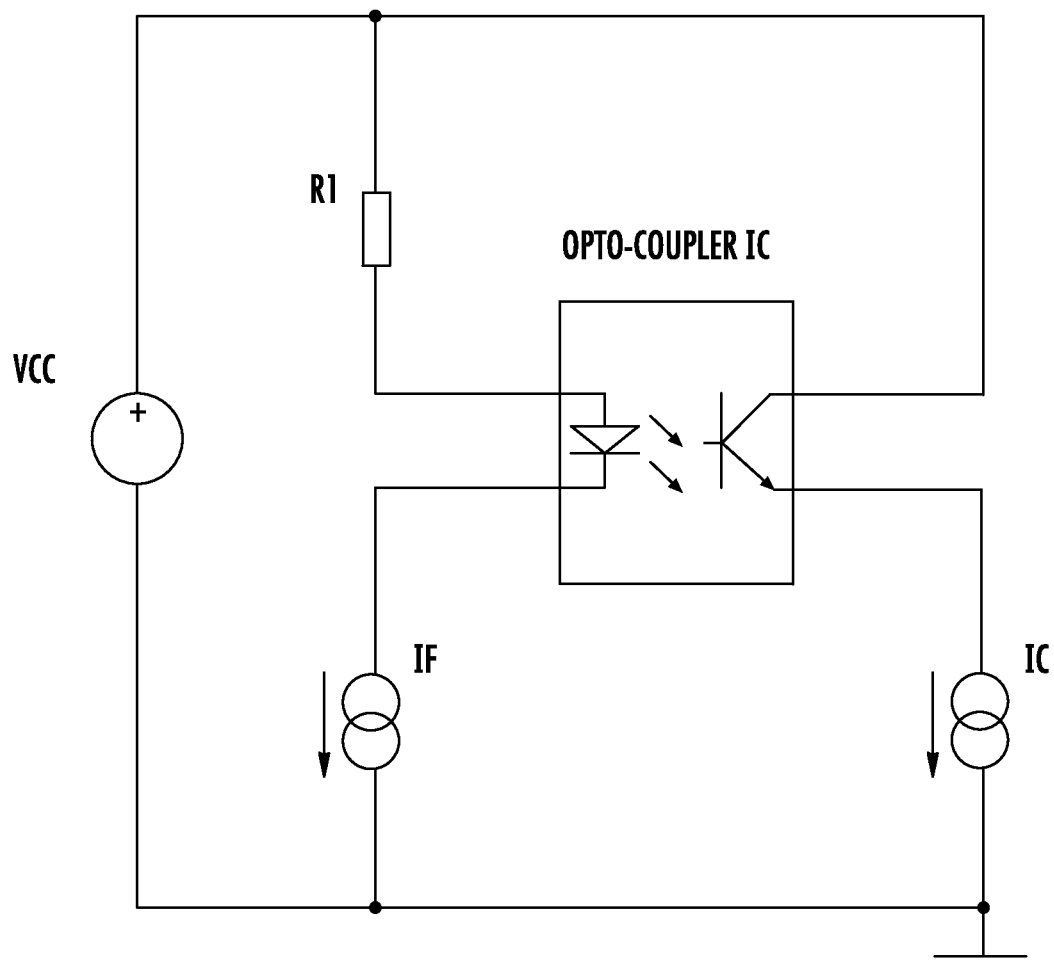
FIG. 3 is a circuit diagram of a test circuit for determining a current transfer ratio of an opto-coupler.

The pre-optimizing procedure begins with determining the $CTR_X$ of the opto-coupler that will be used in the sample power supply unit. This may be accomplished by installing the opto-coupler in the example test circuit shown in FIG. 3. When applicable, the voltage source Vcc in FIG. 3 is set to the same value used by the vendor to determine the rank (i.e., the CTR range) of the opto-coupler. Similarly, the value of the resistor R1 is preferably set such that the forward current through the diode If has the same value as that used by the vendor to determine the opto-coupler's rank. The current through the opto-coupler's collector Ic is measured. The $CTR_X$ of the opto-coupler can then be calculated using the following equation:

$$CTR_X = Ic/If * 100\%.$$

Next, the opto-coupler is installed in the sample power supply unit. The error voltage output by the digital controller (e.g., at terminal 114 in the power supply of FIG. 1) is then measured while the power supply is coupled to a known load with the digital controller operating with an initial or default gain adjustment value $Kadj_D$. For this example, assume the power supply is coupled to a half load, so the measured error voltage is $V_{EA\ half load}$. The corresponding current through the opto-coupler's collector $IC_{half load}$ can be calculated from the following equation:

$$Ic_{half load} = CTR_X * ((V_{EA\ half load} - Vcc)/R1).$$

Using the calculated value of $Ic_{half load}$, the error voltage $V_{EAMAX}$ that would be output by the digital controller if the $CTR_X$ of its opto-coupler was equal to $CTR_{MAX}$ (while the power supply is coupled to the half load) can be calculated as follows:

$$V_{EAMAX} = ((Ic_{half load} * R1)/CTR_{MAX}) + Vcc$$

Similarly, the error voltage $V_{EAMIN}$ that would be output by the digital controller if the $CTR_X$ of its opto-coupler was equal to $CTR_{MIN}$ (while the power supply is coupled to the half load) can be calculated as follows:

$$V_{EAMIN} = ((Ic_{half load} * R1)/CTR_{MIN}) + Vcc$$

Next, the value of R1 in the sample power supply unit is adjusted (e.g., using a potentiometer) so that the error voltage $V_{EA\ half load}$ output by the digital controller while the power supply is coupled to the half load equals the calculated value $V_{EAMAX}$. At this point, the sample power supply unit is emulating its operation with an opto-coupler having a current transfer ratio equal to $CTR_{MAX}$.

Figure 4A:
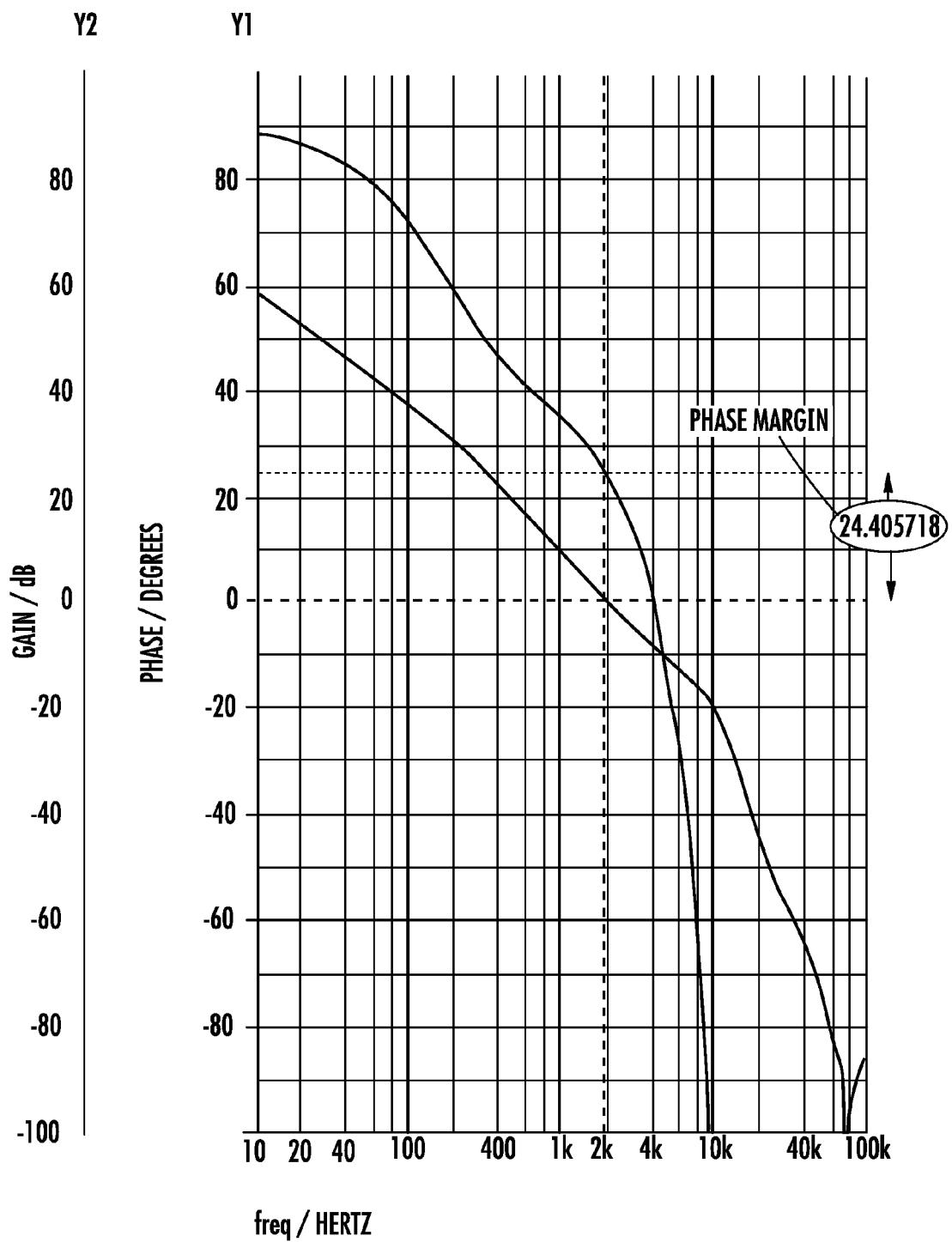
FIGS. 4A-4C illustrate the phase margin, gain margin and dynamic frequency response, respectively, of a sample power supply unit prior to optimizing its gain adjustment value.
Figure 4B:
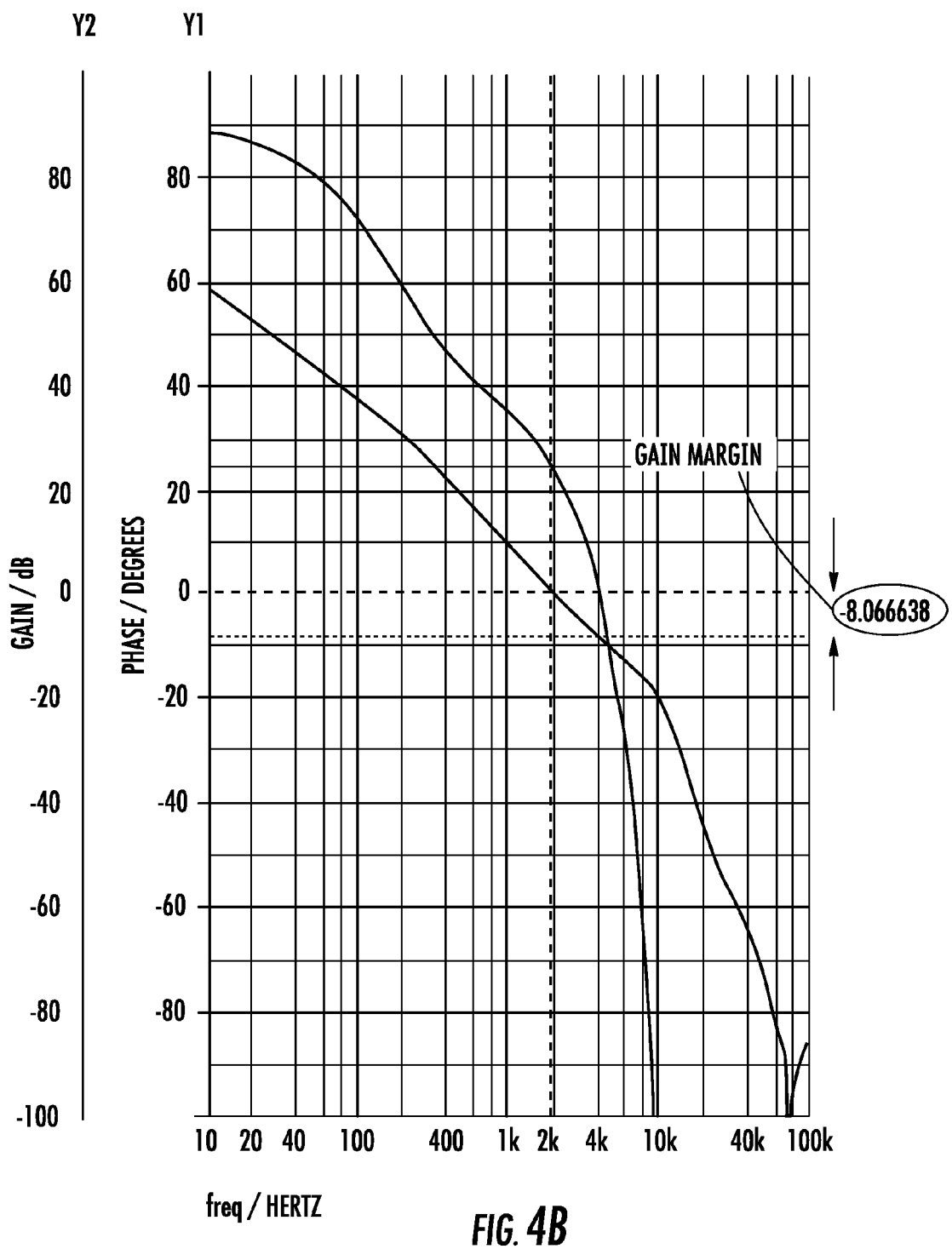
Figure 4C:
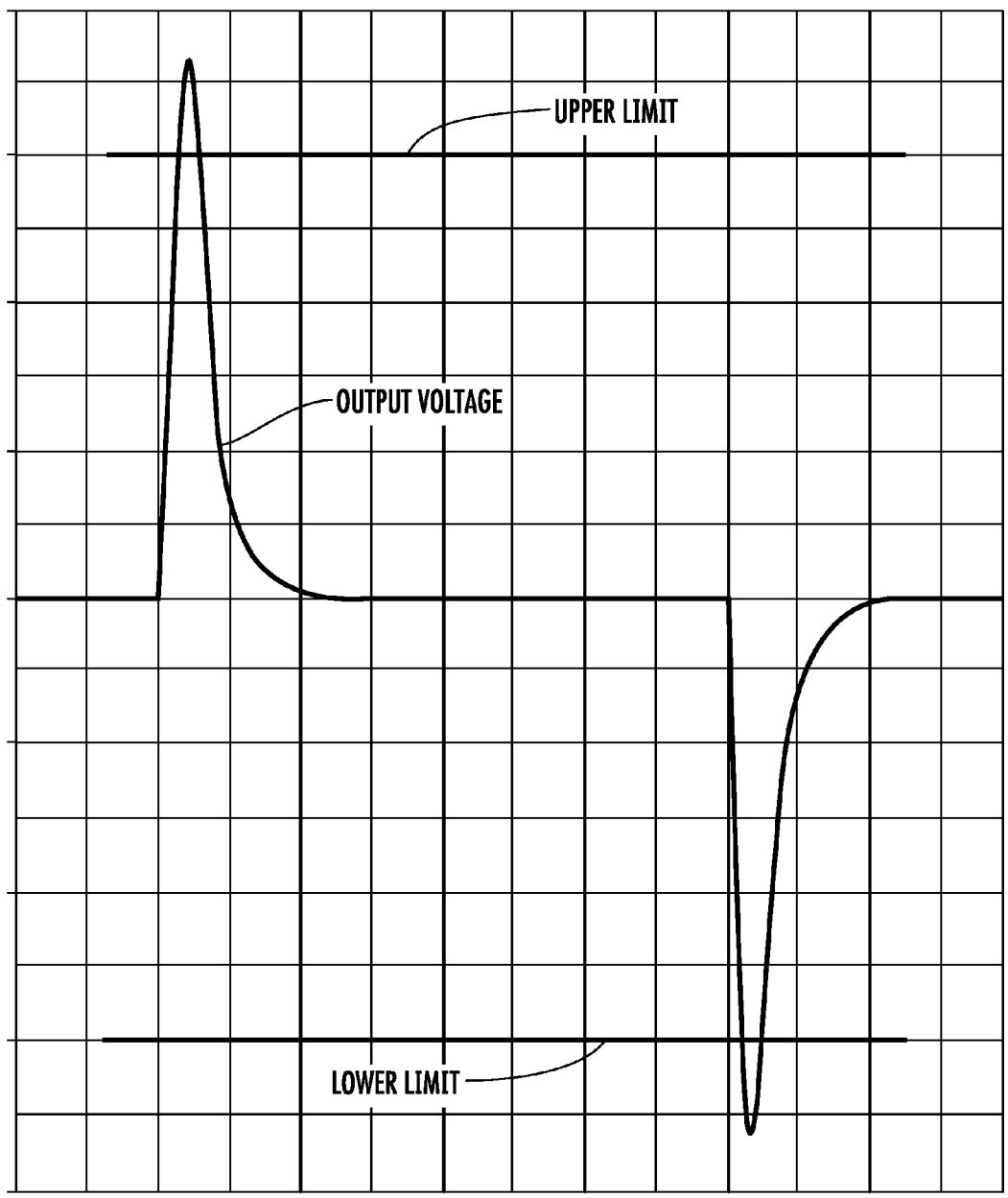
Figure 5A:
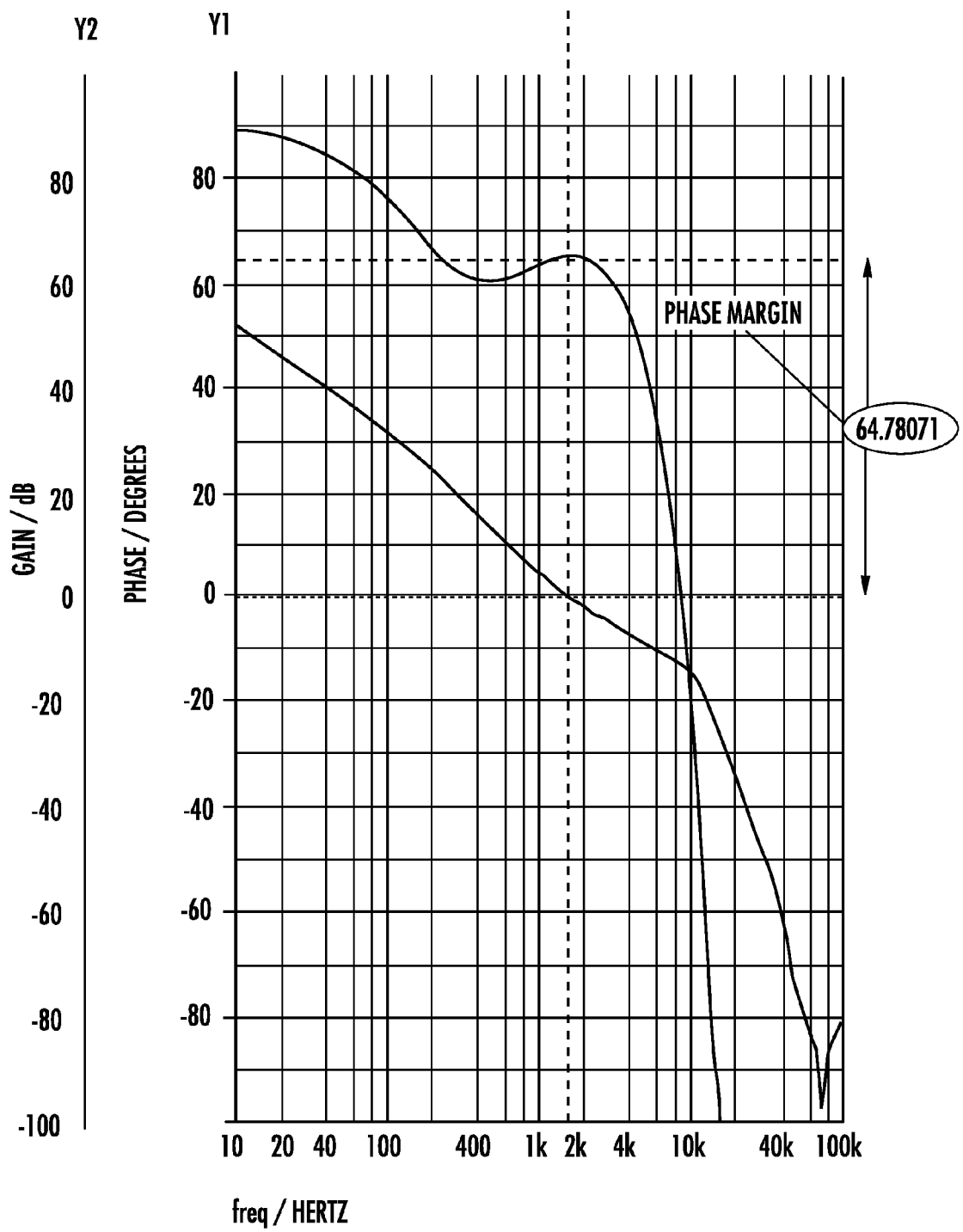
FIGS. 5A-5C illustrate the phase margin, gain margin and dynamic frequency response, respectively, of the sample power supply unit following optimization of its gain adjustment value.
Figure 5B:
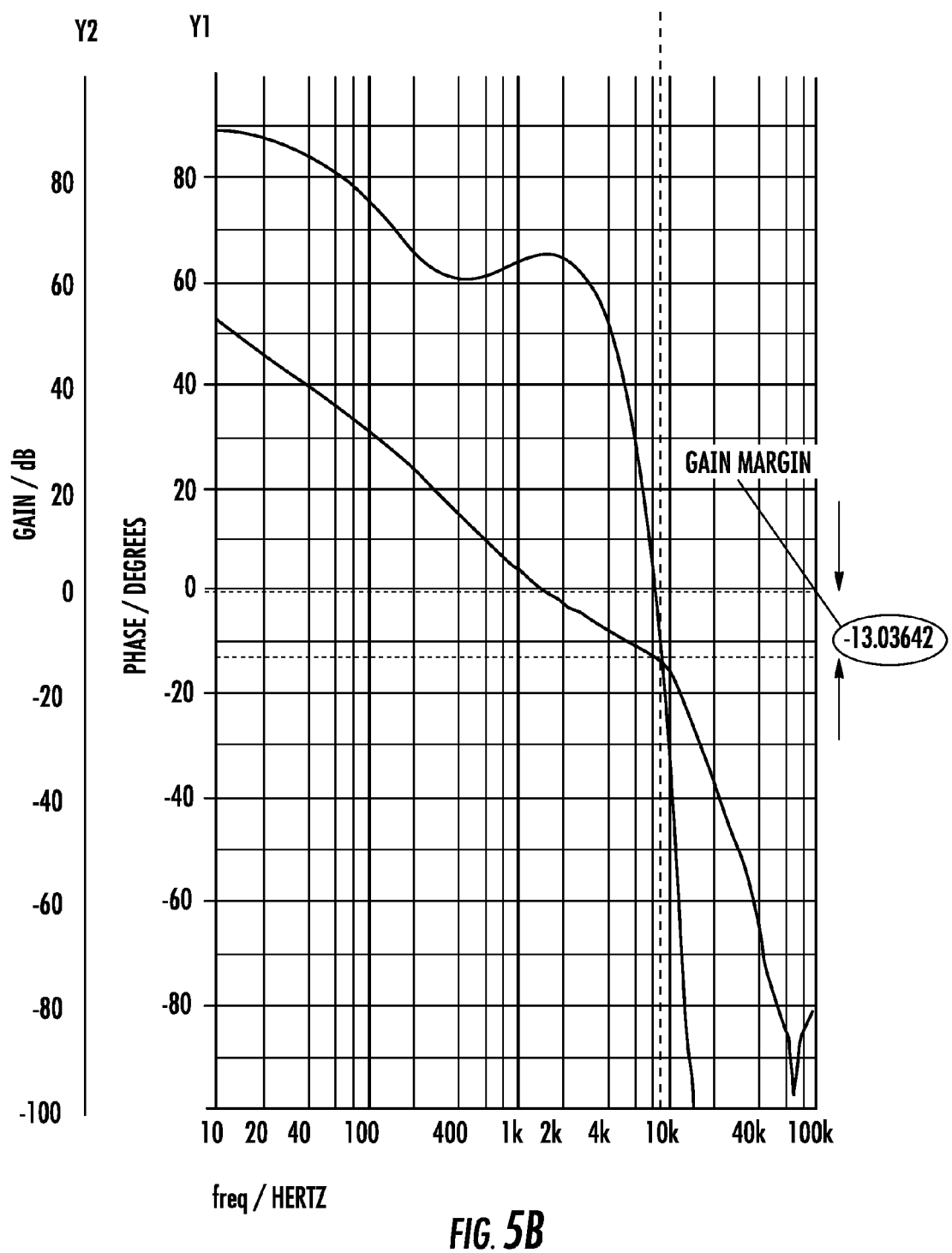
Figure 5C:
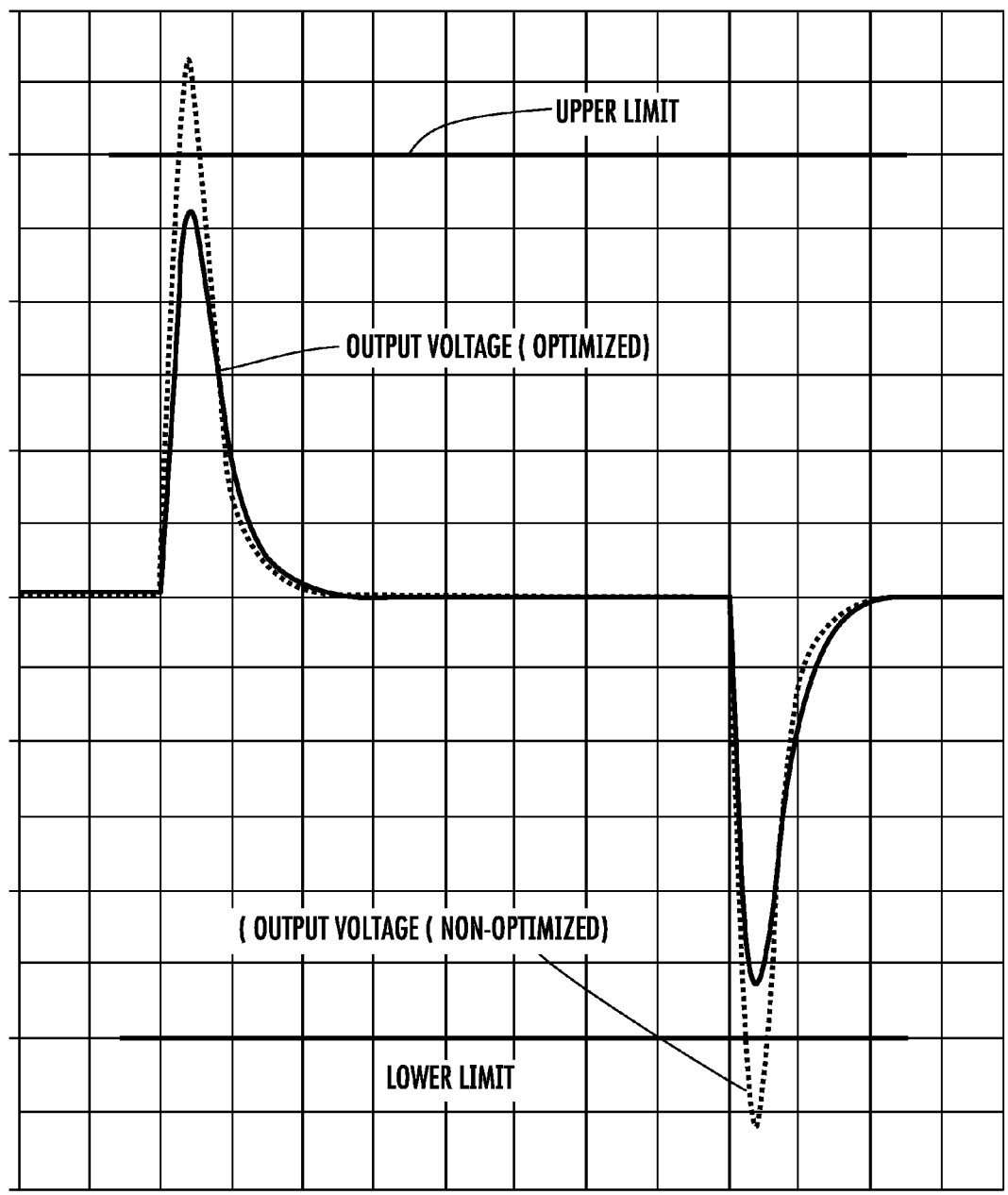

The performance of the sample power supply unit is now evaluated via bode plots or other suitable means. For example, the sample power supply unit may have a phase margin of 24.40 degrees as shown in FIG. 4A, whereas a phase margin greater than 45 degrees is required by the power supply specifications. Similarly, the sample power supply unit may have a gain margin of −8.07 dB as shown in FIG. 4B, whereas as a gain margin of at least −12 dB is required. Also, the sample power supply unit may have the dynamic loop response (i.e., in response to a step-load condition) shown in FIG. 4C, which overshoots an upper voltage limit and undershoots a lower voltage limit. Accordingly, the default gain adjustment value $Kadj_D$ used by the digital controller in the sample power supply unit should be adjusted (i.e., optimized) as necessary until the applicable performance specifications are satisfied. This adjustment may, for example, result in the improved gain margin, phase margin and dynamic loop response shown in FIGS. 5A, 5B and 5C.

Once determined, the particular gain adjustment value Kadj that meets required specifications (when the power supply is coupled to the half load and emulating its operation with an opto-coupler having a current transfer ratio equal to $CTR_{MAX}$) can be stored as $Kadj_{MAX}$ in the digital controller of the sample power supply unit. Further, the parameter $Kadj_{MAX}$ should also be stored in every other like power supply unit before commencing the optimization procedure described below for each like power supply unit.

Further, in the particular embodiment under discussion, the following parameters should be stored (in each digital controller and/or a programming device external to the power supply units) before commencing the optimizing procedure: $CTR_{MIN}$, $CTR_{MAX}$, $V_{EAMIN}$, $V_{EAMAX}$ and $Kadj_{MAX}$ (if not already stored).

At this point, an optimal gain adjustment value $Kadj_X$ can be determined for each like power supply unit using the following procedure. First, determine the error voltage output by the digital controller while the power supply unit is coupled to the half load and the digital controller is operating using the gain adjustment value $Kadj_{MAX}$. Then, calculate the CTRx for the opto-coupler in that particular power supply unit using the following equation, the known values of $CTR_{MIN}$ and $CTR_{MAX}$, and the values for $V_{EAMIN}$ and $V_{EAMAX}$ determined in the pre-optimization procedure described above:

$$CTR_X = \frac{CTR_{MAX} - CTR_{MIN}}{V_{EAMAX} - V_{EAMIN}}(V_{EAX} - V_{EAMIN}) + CTR_{MIN}$$

Next, calculate the optimal gain adjustment value $Kadj_x$ for this particular power supply unit using the following equation:

$$Kadj_X = Kadj_{MAX} \cdot CTR_{MAX} \div CTR_X$$

Finally, store this optimal gain adjustment value $Kadj_X$ in the digital controller of this particular power supply unit. This may include powering down the power supply unit, powering up the power supply unit in its bootload mode, replacing the previously stored gain adjustment value $Kadj_{MAX}$ with the optimal gain adjustment value $Kadj_X$ for this particular unit, and powering down the power supply to exit the bootload mode.

The optimizing procedure can then be repeated for the next like power supply unit.

Referring again to FIG. 1, the digital controller 108 may be configured to perform the method 200 of FIG. 2 (e.g., through software) so as to optimize the value of its gain adjustment Kadj for the particular CTRx of the opto-coupler 110. Depending on the particular approach employed, the digital controller 108 may store one or more parameters for use in performing the method 200 of FIG. 2. Such parameters may include, for example, the $CTR_{MIN}$, $CTR_{MAX}$, $V_{EAMIN}$, $V_{EAMAX}$ and $Kadj_{MAX}$ parameters discussed above. The digital controller 108 can be triggered to perform the method via an external command signal or trigger mechanism (e.g., two consecutive toggles of the power supply on switch PSON).

Alternatively, the method 200 of FIG. 2 can be performed by a programming device external to the power supply units (such as the programming device 118 shown in FIG. 1), which can determine the optimal gain adjustment value $Kadj_X$ for each power supply unit, and then store such value in the digital controller. In that case, the programming device may store one or more parameters for use in performing the method 200 of FIG. 2, possibly including the $CTR_{MIN}$, $CTR_{MAX}$, $V_{EAMIN}$, $V_{EAMAX}$ and $Kadj_{MAX}$ parameters discussed above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method of optimizing a gain adjustment value Kadj for a digital controller in an isolated switched mode power supply, the power supply including an opto-coupler having a current transfer ratio $CTR_X$ within a range defined by a minimum current transfer ratio $CTR_{MIN}$ and a maximum current transfer ratio $CTR_{MAX}$, the method comprising:
   determining the $CTR_X$ of the opto-coupler;
   determining an optimal gain adjustment value $Kadj_X$ based on the determined $CTR_X$ and the $CTR_{MAX}$ of the opto-coupler; and
   storing the optimal gain adjustment value $Kadj_X$ in the digital controller.

2. The method of claim 1 wherein determining the $CTR_X$ of the opto-coupler includes determining an error voltage $V_{EAX}$ output by the digital controller when the power supply is coupled to a known load and the digital controller is operating with a gain adjustment value $Kadj_{MAX}$ associated with $CTR_{MAX}$.

3. The method of claim 2 wherein determining the $CTR_X$ of the opto-coupler includes calculating the $CTR_X$ of the opto-coupler based on the determined error voltage $V_{EAX}$ and stored parameters.

4. The method of claim 3 wherein the stored parameters include $Kadj_{MAX}$, $CTR_{MIN}$, $CTR_{MAX}$, an error voltage $V_{EAMIN}$ associated with $CTR_{MIN}$, and an error voltage $V_{EAMAX}$ associated with $CTR_{MAX}$.

5. The method of claim 4 further comprising determining $V_{EAMIN}$ and $V_{EAMAX}$ based on a current transfer ratio of an opto-coupler and an error voltage output by a digital controller in a like power supply unit coupled to said known load, and storing $V_{EAMIN}$ and $V_{EAMAX}$.

6. The method of claim 5 further comprising determining the current transfer ratio of the opto-coupler in the like power supply unit before the opto-coupler in the like power supply unit is installed in the like power supply unit.

7. The method of claim 6 wherein determining the current transfer ratio of the opto-coupler in the like power supply includes using a test circuit.

8. The method of claim 5 further comprising determining $Kadj_{MAX}$ by determining a gain adjustment value Kadj that satisfies performance specifications in the like power supply unit when the like power supply unit is emulating its operation with an opto-coupler having a current transfer ratio equal to $CTR_{MAX}$, and storing $Kadj_{MAX}$.

9. The method of claim 1 wherein determining the optimal gain adjustment value $Kadj_X$ includes calculating the optimal gain adjustment value $Kadj_X$ based on the determined $CTR_X$ and additional stored parameters.

10. The method of claim 9 wherein the additional stored parameters for calculating the optimal gain adjustment value $Kadj_X$ include the $CTR_{MAX}$ and a gain adjustment value $Kadj_{MAX}$ associated with $CTR_{MAX}$.

11. The method of claim 9 further comprising storing the determined optimal gain adjustment value $Kadj_X$ in the digital controller.

12. The method of claim 11 wherein the determining and storing of the optimal gain adjustment value $Kadj_X$ is performed by the digital controller.

13. The method of claim 1 further comprising storing the $CTR_{MIN}$, $CTR_{MAX}$, a gain adjustment value $Kadj_{MAX}$ associated with $CTR_{MAX}$, an error voltage $V_{EAMIN}$ associated with $CTR_{MIN}$, and an error voltage $V_{EAMAX}$ associated with $CTR_{MAX}$ in the digital controller.

14. The method of claim 11 wherein the determining and storing of the optimal gain adjustment value $Kadj_X$ is performed by a programming device external to the switched mode power supply.

15. The method of claim 14 further comprising storing the $CTR_{MIN}$, $CTR_{MAX}$, a gain adjustment value $Kadj_{MAX}$ associated with $CTR_{MAX}$, an error voltage $V_{EAMIN}$ associated with $CTR_{MIN}$, and an error voltage $V_{EAMAX}$ associated with $CTR_{MAX}$ in a programming device external to the switched mode power supply.

16. An isolated switched mode power supply comprising a digital controller and an opto-coupler having a current transfer ratio $CTR_X$ within a range defined by a minimum current transfer ratio $CTR_{MIN}$ and a maximum current transfer ratio $CTR_{MAX}$, the digital controller configured to determine the $CTR_X$ of the opto-coupler, determine an optimal gain adjustment value $Kadj_X$ based on the determined $CTR_X$ and the $CTR_{MAX}$ of the opto-coupler, and store the optimal gain adjustment value $Kadj_X$.

17. An isolated switched mode power supply comprising:
   a power circuit having an output terminal; and
   a control circuit for the power circuit, the control circuit including a digital controller and an opto-coupler having a current transfer ratio $CTR_X$ within a range defined by a minimum current transfer ratio $CTR_{MIN}$ and a maximum current transfer ratio $CTR_{MAX}$, the digital controller having a feedback terminal coupled to the output terminal of the power circuit, and an error voltage terminal coupled to the opto-coupler, the control circuit configured to determine the $CTR_X$ of the opto-coupler when the output terminal is coupled to a known load, determine an optimal gain adjustment value $Kadj_X$ based on the determined $CTR_X$ and the $CTR_{MAX}$, and store the determined optimal gain adjustment value $Kadj_X$ for subsequent use by the digital controller in controlling operation of the power circuit.

18. The power supply of claim 17 wherein the digital controller is configured to determine the $CTR_X$ of the opto-coupler and the optimal gain adjustment value $Kadj_X$ using parameters stored in memory.

19. The power supply of claim 18 wherein the parameters stored in memory include $CTR_{MIN}$, $CTR_{MAX}$, a gain adjustment value $Kadj_{MAX}$ associated with $CTR_{MAX}$, an error voltage $V_{EAMIN}$ associated with $CTR_{MIN}$, and an error voltage $V_{EAMAX}$ associated with $CTR_{MAX}$.

* * * * *